Patented Jan. 23, 1940

2,187,817

UNITED STATES PATENT OFFICE 2,187,817

INTERPOLYMERIZATION PRODUCTS OF VINYL CHLORIDE AND ESTERS OF MALEIC ACID

Heinrich Hopff and Gustav Steinbrunn, Ludwigshafen-on-the-Rhine, and Heinrich Freudenberger, Frankfort-on-the-Main, Germany, assignors to I. G. Farbenindustrie Aktiengesellschaft, Frankfort-on-the-Main, Germany No Drawing. Application December 5, 1936, Serial No. 114,332. In Germany December 13, 1935

10 Claims. (Cl. 260—32)

The present invention relates to interpolymerization products and to a process of producing the same.

It has already been proposed to prepare resinous polymerization products by the conjoint polymerization of polymerizable compounds containing an olefinic double linkage with ethylene-alpha-beta-dicarboxylic acids or their anhydrides or derivatives.

We have now found that especially valuable interpolymerization products can be prepared by polymerizing vinyl chloride together with maleic acid esters in aqueous emulsion, if desired with the addition of other compounds capable of polymerization under the same conditions. For this purpose the esters of maleic acid, as for example its dimethyl ester, diethyl ester, di-normal-butyl ester, di-isobutyl ester, monohexyl ester, dicyclohexyl ester, dibenzyl ester or di(chlorethyl) ester, or the esters of maleic acid with ethylene glycol monomethyl, ethyl or butyl ethers or acetyl glycol are suitable.

The polymerization is carried out in the manner usual for emulsion polymerization. The vinyl chloride together with the desired amount of the maleic acid ester, preferably after the addition of a suitable dispersing agent, is dispersed to a fine milk by shaking or stirring and heated to the polymerization temperature after the addition of a polymerization accelerator.

Generally speaking water-soluble organic solvents, such as methyl or ethyl alcohol or ethylene glycol and acetone and furthermore all bodies containing a lipoid and a hydrophilic radicle, as for example soaps, fatty alcohol sulphonates, alkylated naphthalene sulphonic acids and the like, are suitable dispersing agents. As polymerization accelerators may be mentioned in particular inorganic or organic peroxides and their derivatives, as for example hydrogen peroxide, ammonium persulphate, acetyl or benzoyl peroxide and peracetic acid.

The reaction temperature depends on the desired degree of polymerization of the product. Higher temperatures lead to products of a low degree of polymerization and lower temperatures to those of higher degrees of polymerization. By varying the amounts of the single components, the properties of the interpolymerization products may be varied within wide limits, especially when other polymerizable compounds, as for example acrylic acid esters, styrene and the like, are also polymerized at the same time. Furthermore it is possible to vary the properties of the interpolymerization products, especially their solubility in organic solvents, by treating them with halogens, especially with chlorine.

The polymerization products obtained in the form of a fine milk can be coagulated in the known manner, as for example by adding electrolytes. In order to obtain a greater stability it is preferable to treat the products before, during or after the coagulation with strongly diluted aqueous solutions of alkaline substances, such as caustic alkalies, caustic lime, soda, ammonia or amines.

After washing and drying, the interpolymerization products are obtained as fine white powders. They may be used as plastic masses either alone or in admixture with softening agents, fillers, dyestuffs or with the aid of solvents. As suitable softening agents there may be mentioned for example phosphoric and phthalic acid esters, aralkylated naphthalenes, as for example benzyl naphthalene, or chlorinated naphthalenes or diphenyls. The interpolymerization products also have a good compatibility with cellulose derivatives and other polymerized vinyl compounds and may also be used together with the same.

Any desired shaped articles, as for example combs, toothbrush handles, spectacle frames, sound records, accumulator cases, artificial dentures, pipes, hoses, rods, armatures or printing forms for printing purposes, may be prepared from the said plastic masses in any desired manner as for example by pressing in closed moulds or by working up in extrusion presses or in injection casting machines. Furthermore by simple rolling of the masses on heated rollers, films may be prepared of extremely small thickness (down to $10\mu$) such as cannot be obtained from other known interpolymerization products by the same method. Films and foils of the said interpolymerization products are suitable for example for the preparation of non-splintering glass, for windows for protective masks, as coatings for cigarette tips and as packing material. In the same way as with celluloid foils, there may be prepared from the said foils by blowing hollow bodies, as for example dolls, or hollow bodies having thick walls may also be obtained by winding the foils on a mandrel and then welding by heating under pressure. The working up of the plastic masses into the articles above described is generally speaking effected in approximately the same way as Celluloid. When using the said interpolymerization products for shaped articles, the co-employment of solvents may, however, usually be dispensed with.

The working up takes place especially simply because the interpolymerization products have a very good capacity for flowing. They are moreover distinguished by a strong absorptive power for fillers, by particularly high mechanical strength, waterproof character, stability to light, heat and acid. Thus for example the action of about 50 per cent sulphuric acid for 24 hours at 60° C. occasions no attack. By reason of their good electrical insulating power, the plastic masses are eminently suitable as insulating materials which, contrasted with rubber, yield insulations stable to ageing and ozone and having a very high disruptive strength. This foils of the said interpolymerization products which have been provided with adhesive may also be used as insulating bands or tape. The plastic masses to which softening agents have been added are especially suitable, by reason of their good elasticity, for the preparation of a great variety of useful articles which hitherto have been prepared from rubber. By reason of the excellent stability to water of the masses, they may be used for coating, impregnating or dressing porous materials, in particular fibrous materials, as for example threads, yarns, paper or fabrics and the like, there being thus obtained artificial leather, oilcloth and similar products, linoleum, raincoats, tent material, automobile coverings or membranes for collapsible boats. The impregnation and dressing may be effected in known manner by treating the fibrous materials with solutions of the interpolymerization products. As solvents there may be mentioned in particular methylene chloride, aromatic hydrocarbons, such as benzene and toluene, esters, such as ethyl or butyl acetate, ketones, such as acetone, and glycol ethers and esters. Foils of the interpolymerization products or even the interpolymerization products without preshaping, as for example in the form of powder, may, however, also be pressed onto fabrics or onto paper. By pressing together alternate layers of fibrous material and foils of the interpolymerization products, laminated materials are obtained which may be used for example for driving belts or vat leather. By reason of their specially good solubility in the above mentioned solvents the interpolymerization products are also suitable for the preparation of shaped articles by the immersion method, as for example for the preparation of tubes or medicine flasks, and also for the preparation of adhesives, cements, lacquers and coatings. In many cases use may be made of the aqueous emulsions of the polymerization products directly obtained by the polymerization, if desired with the addition of solvents or softening agents, fillers, rubber latex or synthetically prepared dispersions of other polymerization products.

It is surprising that by the conjoint polymerization of maleic acid esters with vinyl chloride in aqueous emulsion any polymerization takes place at all and that moreover thereby products having especially good properties are obtained. The said esters are either entirely incapable of polymerization by themselves or at least so in aqueous emulsion or can only be polymerized with great difficulty when polymerized for themselves, and also their mixtures with vinyl chloride are very difficult to polymerize, or not at all, when not emulsified.

The following examples will further illustrate how this invention may be carried out in practice but the invention is not restricted to these examples. The parts are by weight.

Example 1

1500 parts of a 2 per cent aqueous solution of alphahydroxyoctodecane sulphonic acid sodium salt which contains 150 parts of 30 per cent hydrogen peroxide and 50 parts of a 10 per cent solution of peracetic acid and which has been adjusted to a pH value of about 3.5 by the addition of an organic acid, are mixed in a closed vessel with 500 parts of vinyl chloride and the latter is emulsified in the mixture by stirring for an hour. 100 parts of maleic acid dimethyl ester are emulsified in 300 parts of an emulsifying liquid of the above composition. This emulsion is pressed into the reaction vessel into the vinyl chloride emulsion at 50° C. in small portions during the course of 24 hours.

When the polymerization is completed, the resulting milk is coagulated by means of aluminium sulphate solution, unchanged maleic acid ester is expelled with steam, the finely-powdered polymerization product is treated at 50° C. with 0.5 per cent caustic soda solution and dried by heating gently after filtration by suction. The product obtained is similar to Celluloid. It has very good mechanical properties and is suitable for the preparation of a great variety of pressed articles, as for example combs, toothbrush parts, spectacle frames and the like. If the polymerization be carried out at from 90° to 100° C. products of lower molecular weight and greater solubility are obtained.

Example 2

30 parts of maleic acid dimethyl ester are polymerized together with 70 parts of vinyl chloride in the manner described in Example 1, and the polymerization product separated by means of aluminium sulphate. The powdery product is heated with 1 per cent caustic soda solution at 50° C. for half an hour, filtered off by suction and dried. The polymerization product obtained is well soluble in methylene chloride, chloroform, tetrachlorethane, benzene, toluene, acetone and ethyl acetate.

Example 3

280 parts of maleic acid diisobutyl ester are emulsified in 6000 parts of an aqueous solution of 60 parts of oleic acid sodium salt and 8 parts of potassium persulphate, added with 1500 parts of vinyl chloride and polymerized at about 50° C. The reaction mixture is worked up in a similar manner as described in Example 2. The interpolymerization product obtained is suitable for the production of shaped articles and as insulating compositions for electrical purposes on account of its good mechanical and electrical insulating properties.

Example 4

186 parts of maleic acid di-n-butylester and 1350 parts of vinyl chloride are emulsified in 3800 parts of a 2 per cent aqueous solution of Turkey red oil which contains 5 parts of peracetic acid, and polymerized at about 40° C. The reaction mixture is worked up in a similar manner as described in Example 2. The interpolymerization product obtained is suitable as electrical insulating material and for the production of films or foils.

Example 5

410 parts of maleic acid diethyl ester are emulsified in a closed vessel together with 900 parts of vinyl chloride in a 1 per cent aqueous solution of Turkey red oil which contains 6 parts of sodium perborate, adjusted to a pH value of 5.8 by the addition of sodium hydroxide solution and polymerized at about 55° C. The interpolymerization product obtained is readily soluble in methylene chloride, chloroform, acetic acid ethyl ester and suitable for lacquering and impregnating purposes and for the production of films and foils.

Example 6

70 parts of maleic acid monothyl ester are polymerized together with 900 parts of vinyl chloride at about 50° C. in an aqueous emulsion in a similar manner as described in Example 3. The product obtained is suitable for the production of films.

Example 7

A mixture of 270 parts of maleic acid dicylohexyl ester and 900 parts of vinyl chloride is polymerized in the same manner as described in Example 6. The interpolymerization product obtained is suitable for the production of shaped articles by injection moulding. If 270 parts of maleic acid dibenzyl ester or di-phenylethyl ester are employed instead of the same amount of maleic acid di-cyclohexyl ester, similar products are obtained.

Example 8

A mixture of 340 parts of maleic acid di-beta-chlorethyl ester and 1000 parts of vinyl chloride is emulsified in a 2 per cent aqueous solution of the sodium salt of oleic methyl taurin and polymerized as described in Example 6. The interpolymerization product obtained is soluble in tetrachlorethane, halogenated hydrocarbons and cyclohexanone and is suitable for lacquers.

Example 9

A mixture of 340 parts of the neutral maleic acid ester of ethylene glycol monomethyl ether and 900 parts of vinyl chloride is emulsified in a closed vessel in a similar manner as described in Example 2. The emulsion obtained is adjusted to a pH value of 5.4 by means of sodium pyrophosphate, added with 5 parts of sodium persulphate and polymerized at about 42° C. The interpolymerization product obtained can be worked up in the same manner as Celluloid to various articles of the daily life. The interpolymerization products derived from about 1 part of the neutral maleic acid ester of ethylene glycol monoethyl- or -butyl ether or of ethylene glycol acetate and about 2 parts of vinyl chloride possess similar properties, but they are more readily soluble in chlorinated hydrocarbons, ethyl acetate and butyl acetate.

Example 10

The interpolymerization product derived from 340 parts of maleic acid dimethyl ester, 900 parts of vinyl chloride and 50 parts of styrene and prepared under the conditions described in Example 3 yields on account of its high softening point valuable moulded articles. The interpolymerization product derived from 270 parts of maleic acid dimethyl ester, 900 parts of vinyl chloride, 20 parts of acrylic acid possesses similar properties. If acrylic acid nitrile is employed instead of acrylic acid harder products are obtained, but if vinyl ethers are employed instead of acrylic acid the products obtained are softer.

Example 11

A map is sprayed by means of a spraying pistol with an emulsion of the interpolymerization product of the neutral maleic ester of glycol monomethyl ether and vinyl chloride prepared according to Example 9, which emulsion has been diluted until it contains about 10 per cent of solid; after drying, the map is pressed for two minutes between highly polished steel plates at about 120° C. A highly polished coating is obtained which is very resistant to external influences and waterproof and which allows the colours of the map to appear very plastically.

Example 12

Cotton fabric is impregnated with the aqueous dispersion obtained by emulsion polymerization of a mixture of 186 parts of maleic di-normal-butyl ester and 1350 parts of vinyl chloride, to which dispersion 20 parts of tricresyl phosphate have been added. The fabric is then ironed. The fabric thus acquires a waterproof dressing.

Example 13

A sample of an interpolymerization product of 80 parts of vinyl chloride and 20 parts of maleic acid di-isobutyl ester obtained by emulsion polymerization is rolled at about 140° C. until a firmly coherent smooth foil is obtained. The product pretreated in this manner may be drawn out to a foil of about 20µ in thickness on a four roller calender.

In the same way foils of about 1 millimeter in thickness may be drawn out from the interpolymerization product mentioned in Example 1, the foils then being pressed at about 120° C. between highly polished nickel plates for a short time. The products are clear as glass and can be used for all purposes for which celluloid in foil form has hitherto been used, as for example for blowing hollow bodies (dolls and children's toys), for the drawing of boxes, hemispheres and containers and for sound-recording plates.

The thin foils may readily be welded homogeneously together by superimposition and pressing while heating. In this way thick, transparent plates are obtained which may be used for preparing toothbrush handles, door handles, stick handles and the like.

Example 14

An interpolymerization product of 75 parts of vinyl chloride and 25 parts of maleic acid di-isobutyl ester obtained by emulsion polymerization is pressed for 5 minutes at 130° C. into an accumulator case. The latter is transparent and of excellent stability to acid.

Example 15

10 parts of an interpolymerization product of 80 parts of vinyl chloride and 20 parts of the neutral maleic acid ester of glycol monobutyl ether obtained by emulsion polymerization are rolled at 140° C. with 4 parts of phthalic acid dibutyl ester and 2 parts of carbon black. A tough, black product is obtained which may be used with advantage as a leather substitute.

By rolling in from 3 to 5 parts of cork meal, masses similar to linoleum are obtained.

If the mixture be drawn out into thin foils on rollers and several of these foils be laminated with alternate layers of cotton fabric, there is obtained by pressing while heating a very strong plate stable to oil and benzine which is eminently suitable for the preparation of packing rings.

Example 16

100 parts of an interpolymerization product of 75 per cent of vinyl chloride and 25 per cent of maleic acid di-isobutyl ester obtained by emulsion polymerization are rolled with 30 parts of chlorinated diphenyl containing about 50 per cent of chlorine until a homogeneous mass is obtained. This is eminently suitable for spraying wires and cables and for the preparation of insulating sheaths.

Example 17

100 parts of an interpolymerization product of 20 parts of neutral maleic ester of glycol monoethyl ether and 80 parts of vinyl chloride obtained by emulsion polymerization are dissolved in 1000 parts of methylene chloride and 20 parts of benzyl tetrahydronaphthalene. The solution is suitable as a lacquer and leaves behind after drying a waterproof, well-adherent film. It may also be used for the preparation of immersion bodies.

What we claim is:

1. The process of producing interpolymerization which comprises polymerizing vinyl chloride together with a maleic acid ester of a saturated alcohol in an aqueous emulsion the amount of vinyl chloride by weight being at least about 2.2 times the amount of said ester by weight.

2. The process of producing interpolymerization products which comprises polymerizing vinyl chloride together with a maleic acid ester of a saturated alcohol in an aqueous emulsion in the presence of further compounds capable of polymerization under the same conditions the amount of vinyl chloride by weight being at least about 2.2 times the amount of said ester by weight.

3. The process of producing interpolymerization products which comprises polymerizing vinyl chloride together with a maleic acid ester of a saturated alcohol in an aqueous emulsion in the presence of peroxides as catalysts the amount of vinyl chloride by weight being at least about 2.2 times the amount of said ester by weight.

4. The process of producing interpolymerization products which comprises polymerizing vinyl chloride together with maleic dimethyl ester in an aqueous emulsion the amount of vinyl chloride by weight being at least about 2.2 times the amount of said ester by weight.

5. The process of producing interpolymerization products which comprises polymerizing vinyl chloride together with maleic di-normal-butyl ester in an aqueous emulsion the amount of vinyl chloride by weight being at least about 2.2 times the amount of said ester by weight.

6. The process of producing interpolymerization products which comprises polymerizing vinyl chloride together with the neutral maleic acid ester of ethylene glycol monoethyl ether in an aqueous emuslion the amount of vinyl chloride by weight being at least about 2.2 times the amount of said ester by weight.

7. Aqueous emulsion interpolymerization products of vinyl chloride and a maleic acid ester of a saturated alcohol, said products being obtained according to the process of claim 1.

8. Aqueous emulsion interpolymerization products of vinyl chloride and maleic acid dimethyl ester, said product being obtained according to the process of claim 4.

9. Aqueous emulsion interpolymerization products of vinyl chloride and maleic acid di-normalbutyl ester, said products being obtained according to the process of claim 5.

10. Aqueous emulsion interpolymerization products of vinyl chloride and the neutral maleic ester of ethylene glycol monoethyl ether, said products being obtained according to the process of claim 6.

HEINRICH HOPFF.
GUSTAV STEINBRUNN.
HEINRICH FREUDENBERGER.